(12) United States Patent
Ishibashi et al.

(10) Patent No.: US 8,479,970 B2
(45) Date of Patent: Jul. 9, 2013

(54) HIGH CORROSION RESISTANT EQUIPMENT FOR A PLANT

(75) Inventors: Ryo Ishibashi, Naka-gun (JP); Katsuhito Takahashi, Hitachi (JP); Seunghwan Park, Mito (JP); Shinya Imano, Hitachi (JP); Haruo Akahoshi, Hitachi (JP); Kenya Ohashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/523,404

(22) Filed: Jun. 14, 2012

(65) Prior Publication Data
US 2012/0321904 A1    Dec. 20, 2012

(30) Foreign Application Priority Data
Jun. 14, 2011 (JP) .................................. 2011-131796

(51) Int. Cl.
*B23K 20/12* (2006.01)
(52) U.S. Cl.
USPC .......................................... 228/112.1; 428/544
(58) Field of Classification Search
None
See application file for complete search history.

(56) References Cited

U.S. PATENT DOCUMENTS

| | | | | |
|---|---|---|---|---|
| 6,045,027 A | * | 4/2000 | Rosen et al. | 228/112.1 |
| 6,051,325 A | * | 4/2000 | Talwar et al. | 428/593 |
| 6,105,902 A | * | 8/2000 | Pettit | 244/119 |
| 7,115,324 B1 | * | 10/2006 | Stol et al. | 428/594 |
| 2004/0050907 A1 | * | 3/2004 | Dracup et al. | 228/112.1 |
| 2004/0069833 A1 | * | 4/2004 | Aota et al. | 228/112.1 |
| 2004/0149807 A1 | * | 8/2004 | Schilling et al. | 228/112.1 |
| 2007/0065716 A1 | * | 3/2007 | Hsu | 429/164 |
| 2008/0135405 A1 | * | 6/2008 | Hori et al. | 204/298.12 |
| 2008/0302474 A1 | * | 12/2008 | Chen et al. | 156/261 |
| 2010/0001043 A1 | * | 1/2010 | Fukuda | 228/114.5 |
| 2010/0167083 A1 | * | 7/2010 | Park et al. | 428/615 |
| 2010/0279146 A1 | * | 11/2010 | Rowe et al. | 428/650 |
| 2011/0113950 A1 | * | 5/2011 | Reed et al. | 89/36.02 |

FOREIGN PATENT DOCUMENTS

| | | | |
|---|---|---|---|
| JP | 11-028583 A | * | 2/1999 |
| JP | 2000301363 A | | 10/2000 |
| JP | 2002248583 A | | 9/2002 |
| JP | 3562014 B2 | | 6/2004 |
| JP | 2005-109069 A | * | 4/2005 |
| JP | 2005-288525 A | * | 10/2005 |
| JP | 2006255711 A | | 9/2006 |
| JP | 2011062731 A | | 3/2011 |

* cited by examiner

*Primary Examiner* — Kiley Stoner
(74) *Attorney, Agent, or Firm* — Volpe and Koenig, P.C.

(57) ABSTRACT

Provided is high corrosion resistant equipment for a plant having the lining structure which exhibits high reliability against breaking of a joining portion over a long use period. The high corrosion resistant equipment for a plant includes a lining plate and a support portion which are made of a high corrosion resistance material and a structural material portion made of a steel material or the like. The lining plate and the support portion include a joining portion to which friction stirring is applied. The support portion is assembled into or fastened to the structural material portion by means of the geometrical structure with a gap interposed between the support portion and the structural material portion. Due to such a constitution, high corrosion resistant equipment for a plant having the lining which exhibits high reliability can be acquired.

8 Claims, 13 Drawing Sheets

HIGH CORROSION RESISTANT EQUIPMENT FOR A PLANT

BACKGROUND OF THE INVENTION

1. Field of the Invention

The present invention relates to high corrosion resistant equipment for a plant having the lining structure using high corrosion resistant metal materials, and more particularly to high corrosion resistant equipment for a plant which can be operated for a long period by suppressing breaking of the lining.

2. Description of the Related Art

With respect to plant equipment which uses a gas or a liquid having high corrosiveness, a reactor, piping and the like which constitute the equipment are required to maintain soundness of materials against corrosion throughout a use period. A material which is exposed to a corrosive environment is selected by evaluating a use period and a corrosion resistant life while also taking economic efficiency into consideration. However, in a harsh corrosion environment, a high corrosion resistant material whose raw material cost and manufacturing cost are high is used. Particularly, when the large structure is manufactured using only a high corrosion resistant material, a raw material cost and a manufacturing cost are increased, and there also arises a difficulty that it is necessary to increase a plate thickness when strength of the material is found to be low in a structural strength designing. There also may be a case where the structure cannot be manufactured with a currently available manufacturing technique. In view of the above-mentioned circumstances, it may be possible to adopt a method where corrosion resistance against a corrosive environment is imparted to the structure by covering a surface of a structural material such as a steel material for maintaining structural strength with coating or lining made of a high corrosion resistant material.

As the method where the surface of the structural material such as the steel material for maintaining structural strength is covered with the high corrosion resistant material for imparting corrosion resistance against the corrosion environment to the structure, there have been conventionally adopted high corrosion resistant material coating which is obtained by performing welding using a high corrosion resistant material welding material or by performing thermal spraying of a high corrosion resistant powdery material, and lining which is obtained by joining a corrosion resistant material plate material to a structural material by rolling or explosion cladding.

Zirconium, a zirconium alloy, titanium, and a titanium alloy (hereinafter referred to as zirconium, titanium and the like) exhibit excellent corrosion resistance and hence, these materials are used in a chemical product manufacturing plant and a chemical processing plant. In joining zirconium, titanium or the like, oxygen or nitrogen which is mixed into a joining portion from atmospheric air at the time of welding forms oxide or nitride thus causing embrittlement of the joining portion. Accordingly, it is necessary to perform welding under a high atmosphere control such as in the inside of a vacuum chamber or in the inside of an inert gas using a shield box for strictly shielding the atmosphere from atmospheric air. Japanese patent 3562014 (patent document 1) discloses the shield box structure or shielding arrangement used at the time of welding.

Friction stir welding is a method where a tool made of a material harder than a material to be joined is inserted into a joining portion of the material to be joined while being rotated, and the material to be joined is joined by friction heat generated between the tool and the material to be joined. This joining is solid-phase joining and hence, it has been known that the deformation of the material to be joined which is caused by joining and a thermal effect imparted to a material to be joined are small compared to welding. As a means for improving quality of a surface, there is a case where friction stirring is also used in addition to joining. JP-A-2006-255711 (patent document 2) discloses, for example, a method where a high corrosion resistant material plate material is joined to a structural material by friction stir welding as a lining. JP-A-2000-301363 (patent document 3) and JP-A-2002-248583 (patent document 4) disclose a method where active metal such as zirconium or titanium is joined to a material to be joined by friction stir welding in a non-oxidizing inert gas atmosphere, thus suppressing the oxidation of a surface of the material to be joined in joining.

In plant equipment which uses a lining made of a high corrosion resistant material, a progress of corrosion is prevented by the lining. Accordingly, when the lining is broken so that a through hole is formed, an outer structural material is exposed to a corrosion environment through the through hole and thereby the equipment may be heavily damaged.

The joining portion between the lining and the structural material differs from a lining base material in material quality under the influence of joining. Further, a tensile residual stress exists in the joining portion and the joining portion is formed into a shape by which a stress is liable to be concentrated structurally in many cases. Accordingly, the joining portion is liable to be broken in various damage modes such as high cycle fatigue caused by vibrations during an operation, low cycle fatigue caused by a start stop operation, stress corrosion cracking or corrosion fatigue due to the superposition of the fatigue with a corrosion environment during an operation. Particularly, when there is a large difference in thermal expansion coefficient between the lining material and the structural material and the difference in temperature in the plant equipment between a period during which plant equipment is stopped and a period during which the plant equipment is operated, a possibility that the joining portion is broken due to a low cycle fatigue caused by a start stop operation becomes high. The joining portion where the lining and the structural material are directly joined to each other forms a dissimilar joint and hence, there is a possibility that a diluted portion is embrittled due to the precipitation of different phases at the time of welding or at the time of operating a plant and thereby the reliability of the joining portion is low in many cases. Depending on a material to be used for forming the lining, the joining portion formed by welding may have a coarse solidification structure. In such a case, the joining portion becomes an undermatching joint where strength of the joining portion is low with respect to a lining base material is formed, thus giving rise to a possibility that the joining portion is largely deformed when a tensile stress is applied to the joining portion so that the joining portion is broken prior to the breaking of the base material.

SUMMARY OF THE INVENTION

Accordingly, it is an object of the present invention to provide high corrosion resistant equipment for a plant having the lining structure which exhibits high reliability against breaking of a joining portion over a long use period.

According to one aspect of the present invention, there is provided high corrosion resistant equipment for a plant which includes a lining plate and a support portion which are made of a high corrosion resistant material and a structural material portion, wherein the lining plate and the support portion are joined to each other by a joining portion formed by friction stirring, and the support portion is fastened to or assembled into the structural material portion by means of the geometrical structure with a gap interposed between the support portion and the structural material portion.

According to the present invention, it is possible to provide the high corrosion resistant equipment for a plant having the lining structure which exhibits high reliability against breaking of the joining portion over a long use period.

DESCRIPTION OF THE PREFERRED EMBODIMENTS

Figure 1:
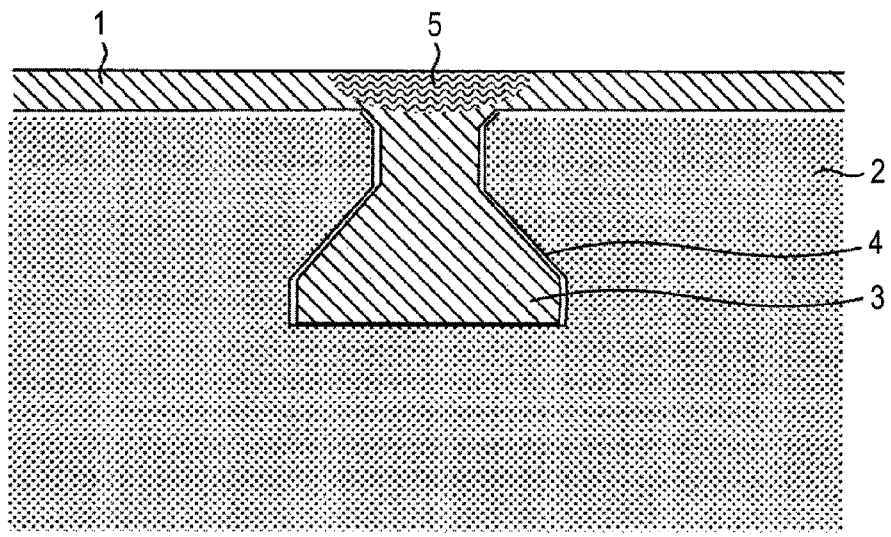
FIG. 1 is a schematic cross-sectional view showing an example of the lining structure according to the present invention.

The present invention is explained in detail hereinafter.

The present invention provides high corrosion resistant equipment for a plant which can suppress breaking of a joining portion of lining by fixing a lining plate made of a high corrosion resistant material to a structural material portion by way of a support portion which is joined by the joining portion to which friction stirring is applied.

The lining plate is not directly joined to the structural material portion and is indirectly fixed to the structural material portion by way of the support portion and hence, strains generated due to the difference in a material characteristic such as the difference in thermal expansion rate between the lining plate and the structural material portion are absorbed by a gap formed between the structural material portion and the support portion and thereby there is no possibility that a stress caused by such strains is applied to the joining portion. The joining portion between the lining plate and the support portion is formed by highly reliable joining of similar composition metals, and a strength of the joining portion becomes higher than a strength of a base material due to friction stirring thus providing an overmatching joint and thereby a possibility that breaking occurs at the joining portion can be decreased.

The joining portion between the lining and the structural material differs from a lining base material in material quality under the influence of joining. Further, a tensile residual stress exists in the joining portion and the joining portion is formed into a shape by which a stress is liable to be concentrated structurally in many cases. Accordingly, the joining portion is liable to be broken in various damage modes such as high cycle fatigue caused by vibrations during an operation, low cycle fatigue caused by a start stop operation, stress corrosion cracking or corrosion fatigue due to the superposition of the fatigue with a corrosion environment during an operation.

As a high corrosion resistant material, zirconium, a zirconium alloy, titanium, a titanium alloy, stainless steel and a nickel alloy have been popularly used as a material for producing a lining. While a thermal expansion coefficient of zirconium or a zirconium alloy is $5.9 \times 10^{-6} K^{-1}$ and a thermal expansion coefficient of titanium or a titanium alloy is $8.5 \times 10^{-6} K^{-1}$, a thermal expansion coefficient of a steel material which is used as a structural material is 10 to $20 \times 10^{-6} K^{-1}$, a thermal expansion coefficient of nickel or a nickel alloy which is used as a structural material is 12 to $14 \times 10^{-6} K^{-1}$, a thermal expansion coefficient of copper or a copper alloy which is used as a structural material is 17 to $23 \times 10^{-6} K^{-1}$, and a thermal expansion coefficient of aluminum or an aluminum alloy which is used as a structural material is 23 to $24 \times 10^{-6} K^{-1}$. Accordingly, zirconium, a zirconium alloy, titanium, and a titanium alloy exhibit small thermal expansion coefficients compared to thermal expansion coefficients of metals used as structural materials. Further, a thermal expansion coefficient of austenite-based stainless steel which is 17 to $18 \times 10^{-6} K^{-1}$ is large compared to thermal expansion coefficients of carbon steel and low-alloy steel which are 10 to $12 \times 10^{-6} K^{-1}$. In the case where the large difference in thermal expansion coefficient exists between a high corrosion resistant material used as a lining material and a structural material, when the temperature difference is large between a period where plant equipment is stopped and a period where the plant equipment is operated, a possibility that breaking occurs due to a low cycle fatigue caused by starting and stopping is increased.

In the high corrosion resistant equipment for a plant according to the present invention, the lining plate is not directly joined to the structural material portion and is indirectly fixed to the structural material portion by way of the support portion, and a gap formed between the support portion and the structural material portion is set based on a change in size due to thermal expansion in view of an operation-time temperature and the structure of the high corrosion resistant equipment for a plant. Accordingly, strains generated due to the difference in material characteristic such as the difference in thermal expansion rate between the lining plate and the structural material portion are absorbed by the gap formed between the support portion and the structural material portion and hence, a stress caused by strains is not applied to the joining portion.

A hole formed on a structural material portion into which a support portion is assembled is formed such that a size of the depth portion is set large compared to a size of an opening portion, and the support portion which is designed with the above-mentioned gap with respect to the size of the hole formed in the structural material portion is assembled into the hole so that the lining plate which is joined to the support portion can be fixed to the structural material portion without fastening. It is difficult to directly insert the support portion having a size larger than a size of the opening portion of the hole formed in the structural material portion into the hole from the opening portion and hence, it is necessary to insert the support portion from a side surface or a back surface of the structural material portion. Accordingly, by adopting a manufacturing method where a support portion is inserted into a hole formed in a structural material portion, and the support portion at a deep hole portion of the structural material portion is deformed by applying a pressure load including friction stirring so as to prevent the support portion from being removed from the hole formed in the structural material portion thus fixing the support portion to the structural material portion, the support portion can be inserted from the hole opening portion formed in the structural material portion so that the manufacturing efficiency can be enhanced.

The joining portion where the lining and the structural material are directly joined to each other forms a dissimilar joint and hence, there is a possibility that a diluted portion is embrittled due to the precipitation of different phases at the time of welding or at the time of operating a plant and thereby the reliability of the joining portion is low in many cases. According to the present invention, the lining plate is fixed to the structural material portion by way of the support portion, and the joining portion between the lining plate and the support portion is formed by joining of the same composition metals and hence, the joining portion exhibits high reliability against an embrittlement phenomenon observed in a dissimilar joint.

A high corrosion resistant material used as a material of a lining, when a joining portion formed by welding becomes a coarse solidification structure, forms an undermatching joint where strength of the joining portion is low compared to strength of a lining base material. Accordingly, there is a possibility that when a tensile stress is applied to the joining portion, the joining portion is largely deformed so that the joining portion is broken prior to breaking of the base material. According to the present invention, a strength of the joining portion becomes higher than a strength of the base material due to friction stirring thus providing an overmatching joint and thereby a possibility that breaking occurs at the joining portion can be decreased.

When oxygen or nitrogen in atmospheric air is mixed into a welded joining portion made of zirconium, a zirconium alloy, titanium or a titanium alloy at the time of welding, oxide or nitride is formed so that the welded joining portion is embrittled. To shield the welded joining portion from atmospheric air, it is necessary to perform welding under a high atmospheric control using a vacuum chamber, an inert gas shield box or the like. A welded joining portion made of zirconium, a zirconium alloy, titanium or an α-based titanium alloy is quenched after welding and hence, the welded joining portion exhibits an acicular α-phase structure. When welding is performed under such an atmosphere control, the welded joining portion exhibits the coarse solidification structure having a grain size of several hundred μm so that there is a case where strength of the joining portion becomes lower than strength of a base material.

With respect to the joining portion between the lining material and the support portion according to the present invention, the lining material and the support portion are joined to each other by friction stirring or the welded joining portion which is welded in advance in a vacuum having an oxygen or nitrogen partial pressure of 100 Pa or less or in an inert gas atmosphere is subjected to friction stirring. In friction stirring, the joining portion plastically flows in a solid state and hence, mixing of oxygen or nitrogen into the joining portion from atmospheric air is extremely small compared to welding. However, a working portion is shielded by spraying an inert gas to the joining portion at a flow rate of 20 L/min or more at the time of performing friction stirring working for suppressing oxidation of a surface of the joining portion.

In the joining portion of the lining plate and the support portion of the present invention, by suppressing the mixing of oxygen and nitrogen into the joining portion from atmospheric air during a joining process thus setting oxygen concentration and nitrogen concentration in the joining portion to at least upper limit values or less of oxygen concentration and nitrogen concentration which are specification values of a base material respectively, the embrittlement of the joining portion can be suppressed. In the joining portion of the lining plate and the support portion made of zirconium or a zirconium alloy, by suppressing the mixing of oxygen and nitrogen into the joining portion from atmospheric air during a joining process thus setting oxygen concentration and nitrogen concentration in the joining portion to at least 1600 ppm or less and 250 ppm or less equal to oxygen concentration and nitrogen concentration in a base material respectively, the embrittlement of the joining portion can be suppressed. Further, in a use environment where corrosion resistance is required, it is desirable to set nitrogen concentration in a zirconium alloy joining portion to 80 ppm or less. With respect to titanium and a titanium alloy, kinds of titanium or titanium alloys having high strength where upper limits of oxygen concentration and nitrogen concentration are raised are standardized. In the joining portion of the lining plate and the support portion made of titanium or a titanium alloy, by suppressing the mixing of oxygen and nitrogen into the joining portion from atmospheric air during a joining process thus setting oxygen concentration and nitrogen concentration in the joining portion to at least upper limits or less of oxygen concentration and nitrogen concentration which are specification values of a base material respectively, the embrittlement of the joining portion can be suppressed. Particularly, with respect to kinds of pure titanium and titanium alloys where the gas component element concentration is low, by setting the oxygen concentration and the nitrogen concentration in the joining portion to 1500 ppm or less and 300 ppm or less respectively, the embrittlement of the joining portion can be suppressed.

The joining portion of the lining plate and the support portion according to the present invention exhibits the equiaxed grain structure where grains are made fine by friction stirring and hence, the embrittlement of the joining portion directly attributed to formed oxide and nitride can be suppressed. By allowing the joining portion to have the equiaxed grain structure having average grain size of 0.5 to 10 μm and by setting the difference in Vickers hardness between the joining portion and a base material to 0 HV or more and less than 100 HV, apparent lowering of ductility is not induced so that an overmatching joint can be obtained.

In lining made of a high corrosion resistant material which is manufactured by the above-mentioned manufacturing method, has the above-mentioned structure and is characterized by the above-mentioned joining portion, breaking of the lining in a start/stop operation and during operation can be suppressed over a long time and hence, it is possible to obtain high corrosion resistant plant equipment such as a reactor or a piping which exhibits corrosion resistant performance which a high corrosion resistant material originally possesses.

EXAMPLE

Table 1, Table 2 and Table 3 show chemical compositions of high corrosion resistant material for forming lining plate and support portion used in the example of the present invention. Table 1 shows the chemical compositions of a zirconium specimen and zirconium alloy specimens. Table 2 shows the chemical compositions of a titanium specimen and titanium alloy specimens. Table 3 shows the chemical compositions of a stainless steel specimens and nickel alloy specimens.

TABLE 1

| specimen | chemical composition (mass %) | | | | | | | | | |
|---|---|---|---|---|---|---|---|---|---|---|
| | Zr | Sn | Fe | Ni | Cr | Hf | C | N | O | H |
| pure zirconium | balance | — | 0.08 | — | 0.02 | 0.77 | 0.031 | 0.0059 | 0.1330 | 0.0005 |
| zirconium alloy 1 | balance | 1.39 | 0.22 | <0.01 | 0.12 | — | 0.017 | 0.0021 | 0.1271 | 0.0005 |
| zirconium alloy 2 | balance | 1.28 | 0.17 | 0.07 | 0.10 | — | 0.011 | 0.0019 | 0.1146 | 0.0014 |

TABLE 2

| specimen | chemical composition (mass %) | | | | | | | | | | |
|---|---|---|---|---|---|---|---|---|---|---|---|
| | Ti | Fe | Ni | Cr | Al | V | C | N | O | H | others |
| pure titanium | balance | 0.09 | — | — | — | — | 0.035 | 0.011 | 0.1221 | 0.0013 | — |
| titanium alloy 1 | balance | 0.14 | 0.45 | 0.12 | — | — | 0.028 | 0.014 | 0.1451 | 0.0021 | Ru: 0.02, Pd: 0.01 |
| titanium alloy 2 | balance | 0.12 | — | — | 6.1 | 3.9 | 0.032 | 0.012 | 0.1138 | 0.0015 | — |

TABLE 3

| specimen | chemical composition (mass %) | | | | | | | | | | | |
|---|---|---|---|---|---|---|---|---|---|---|---|---|
| | Ni | Fe | Co | Cr | Mo | Si | Mn | P | S | C | N | O | others |
| stainless steel 1 | 10.8 | balance | <0.01 | 18.7 | — | 0.55 | 1.14 | 0.008 | 0.002 | 0.012 | 0.02 | 0.0012 | |
| stainless steel 2 | 20.6 | balance | <0.01 | 24.2 | — | 0.24 | 0.69 | 0.007 | 0.001 | 0.011 | 0.02 | 0.0013 | Nb: 0.24 |
| nickel alloy 1 | balance | 8.5 | <0.01 | 29.5 | — | 0.32 | 0.38 | 0.001 | 0.001 | 0.012 | 0.02 | — | |
| nickel alloy 2 | balance | 2.4 | 0.6 | 21.5 | 9.2 | 0.35 | 0.35 | 0.001 | 0.001 | 0.015 | 0.02 | — | Nb: 3.7, Ta: 0.9 |
| nickel alloy 3 | balance | 2.9 | 1.2 | 22.1 | 13.2 | 0.05 | 0.4 | 0.001 | 0.001 | 0.005 | 0.02 | — | W: 2.8, V: 0.21 |

Zirconium, a zirconium alloy, titanium, a titanium alloy, stainless steel and a nickel alloy have been popularly used as a material for producing a lining material. Table 1 shows example of these lining materials. A zirconium alloy may be produced by alloying niobium or hafnium besides tin, iron, chromium or nickel, and contents of oxygen, nitrogen, carbon and hydrogen are defined. A titanium alloy is classified into an α alloy, an α-β alloy and a β alloy in accordance with the crystal structure at a room temperature.

The titanium alloy 1 shown in Table 2 is an a alloy, and may be produced by alloying chromium, nickel, ruthenium and palladium besides iron, and contents of oxygen, nitrogen, carbon and hydrogen are defined. The titanium alloy 2 shown in Table 2 is an α-β alloy, and is produced by alloying iron, aluminum and vanadium, and contents of oxygen, nitrogen, carbon and hydrogen are defined.

Some stainless steels shown in Table 3 may be produced by alloying molybdenum, niobium, titanium or tantalum besides chromium, nickel, silicon or manganese, and contents of phosphorus, sulfur, nitrogen and carbon are defined. Some nickel alloys shown in Table 3 may be produced by alloying molybdenum, tungsten, copper, aluminum, titanium, niobium and tantalum besides chromium, iron, silicon or manganese, and contents of phosphorus, sulfur and carbon are defined. The above-mentioned zirconium, zirconium alloy, titanium, titanium alloy, stainless steel or nickel alloy is subjected to solution heat treatment or heat treatment for thermal refining after hot forging/rolling and is formed into a predetermined shape by machining. Further, after the hot forging/rolling or heat treatment, zirconium, zirconium alloy, titanium, titanium alloy, stainless steel or nickel alloy may be formed into a predetermined size by cold rolling. A surface of lining plate is held in a cold-worked state or is finished by machined machining, polishing, acid pickling or the like.

FIG. 1 is a schematic cross-sectional view of an example of the lining structure according to the present invention. A lining portion 1 made of a high corrosion resistant material is fixed to a structural material portion 2 by the following structure. A hole 4 is formed in the structural material portion 2 such that a size of a deep portion is larger than a size of a lining side opening portion. A support portion 3 of the lining portion 1 is arranged in the hole 4 with a gap therebetween in a state where the support portion 3 is not geometrically removable. Further, the lining portion 1 is joined to the support portion 3 by a joining portion 5 formed by friction stirring. The support portion 3 has a plate or rod shape and also has a depth in the direction perpendicular to a surface of a paper in FIG. 1. As a material used for forming the structural material portion 2, a steel material such as carbon steel, low alloy steel or stainless steel, nickel or a nickel alloy, copper or a copper alloy such as brass, aluminum or an aluminum alloy is named. The structural material portion 2 made of such a material ensures structural strength against an operation temperature of equipment.

Figure 2:
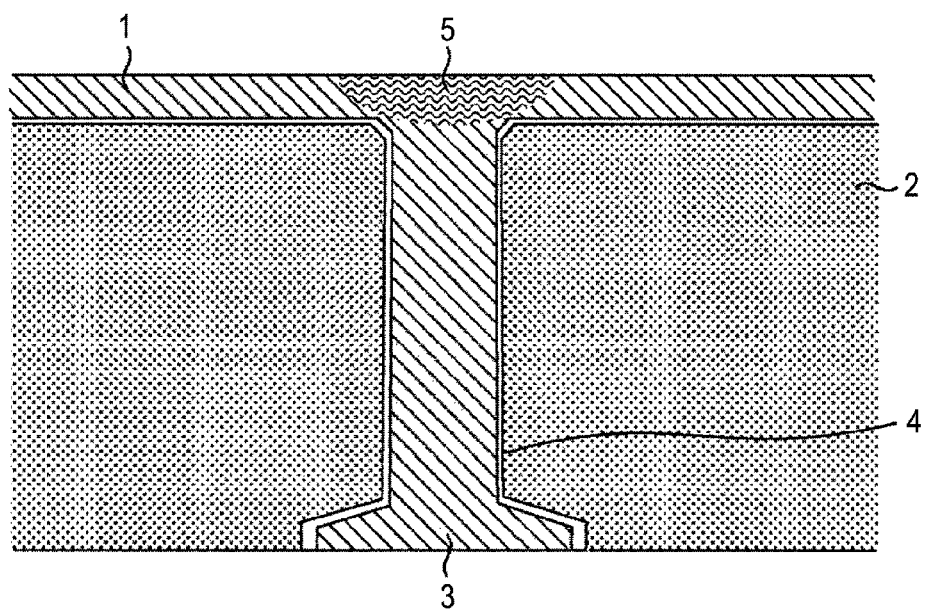
FIG. 2 is a schematic cross-sectional view showing an example of the lining structure according to the present invention.

In FIG. 2 which is a schematic cross-sectional view of an example of the lining structure according to the present invention, a lining portion 1 made of a high corrosion resistant material is fixed to a structural material portion 2 by the following structure. A hole 4 is formed in the structural material portion 2 such that a size of a back surface opening portion is larger than a size of a lining side opening portion. A support portion 3 of the lining portion 1 is arranged in the hole 4 with a gap therebetween in a state where the support portion 3 is not geometrically removable. Further, the lining portion 1 is joined to the support portion 3 by a joining portion 5 formed by friction stirring. The support portion 3 has a plate shape and also has a depth in the direction perpendicular to a surface of a paper in FIG. 2 or has a rod shape parallel to the thickness direction of the structural material portion 2.

Figure 3:
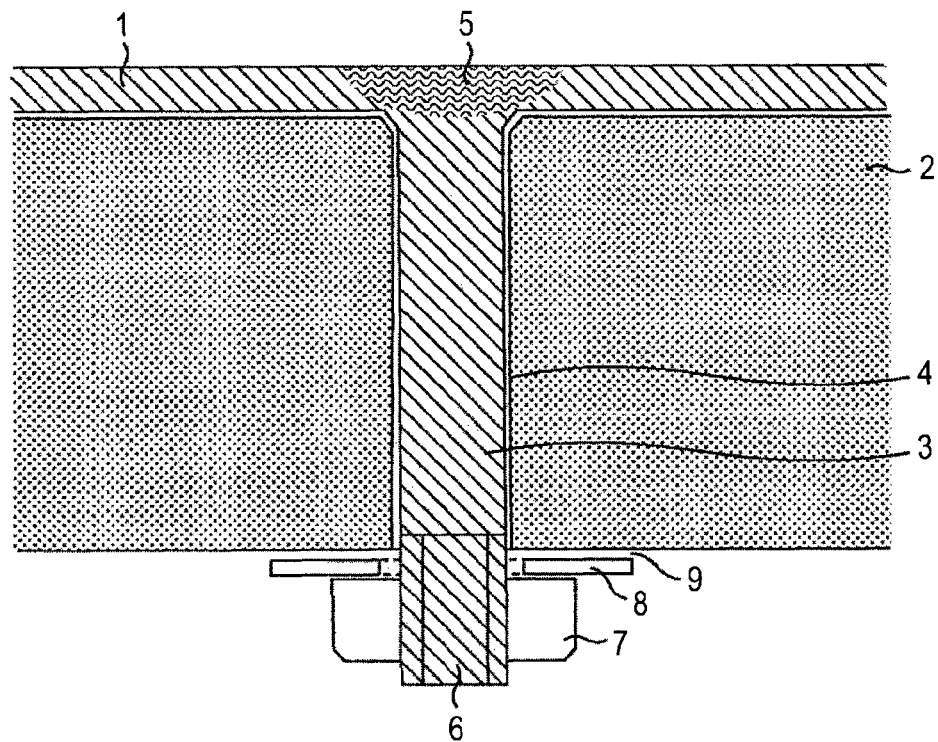
FIG. 3 is a schematic cross-sectional view showing an example of the lining structure according to the present invention.

In FIG. 3 which is a schematic cross-sectional view of an example of the lining structure according to the present invention, a lining portion 1 made of a high corrosion resistant material is fastened to a structural material portion 2 by the following structure. A hole 4 is formed in the structural material portion 2 in a penetrating manner from a lining side to a back surface. A rod-shaped support portion 3 is arranged in the hole 4 with a gap therebetween, and a nut 7 and a washer 8 are fastened to a threaded portion 6 of the support portion 3 arranged on a back surface side of the structural material portion 2 with a gap 9 formed between the structural material portion 2 and the washer 8. Further, the lining portion 1 is joined to the support portion 3 by a joining portion 5 formed by friction stirring. To fasten a threaded portion 6 of the support portion 3 to the structural material portion 2 by the nut 7 and the washer 8 while forming the gap 9 between the structural material portion 2 and the washer 8, the nut 7 is fixed by welding or using an adhesive agent. Alternatively, a spring washer is inserted between the nut 7 and the washer 8 so as to fix the nut 7 and also to impart expansion and contraction of the spring washer corresponding to the gap 9.

The example of the lining structure according to the present invention is explained using a schematic view where the lining structure is viewed from a lining side.

Figure 4:
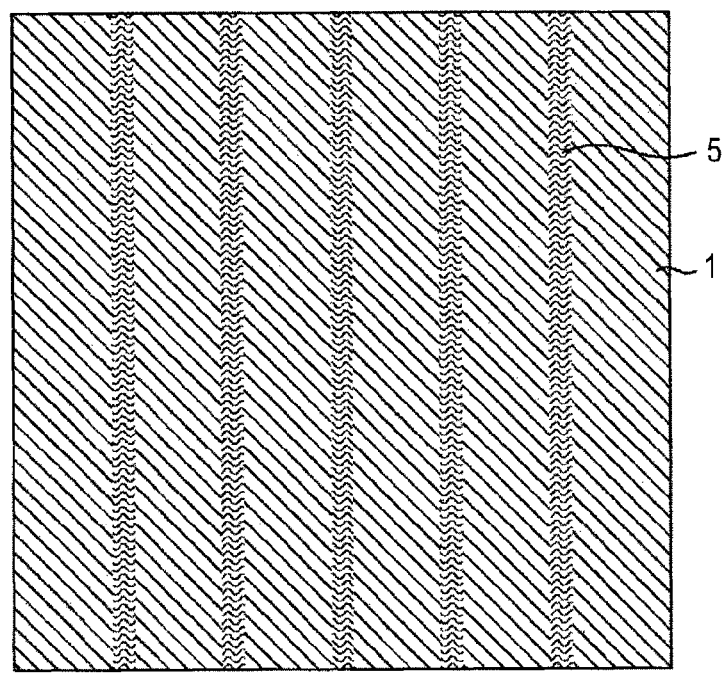
FIG. 4 is a schematic view of the example of the lining structure according to the present invention as viewed from a lining side.

In FIG. 4, the support portion 3 having a plate or rod shape and having a depth in the direction perpendicular to a surface of a paper in the lining structure shown in FIG. 1 and FIG. 2 is continuously joined to the lining material by the joining portion 5 due to friction stirring.

Figure 5:
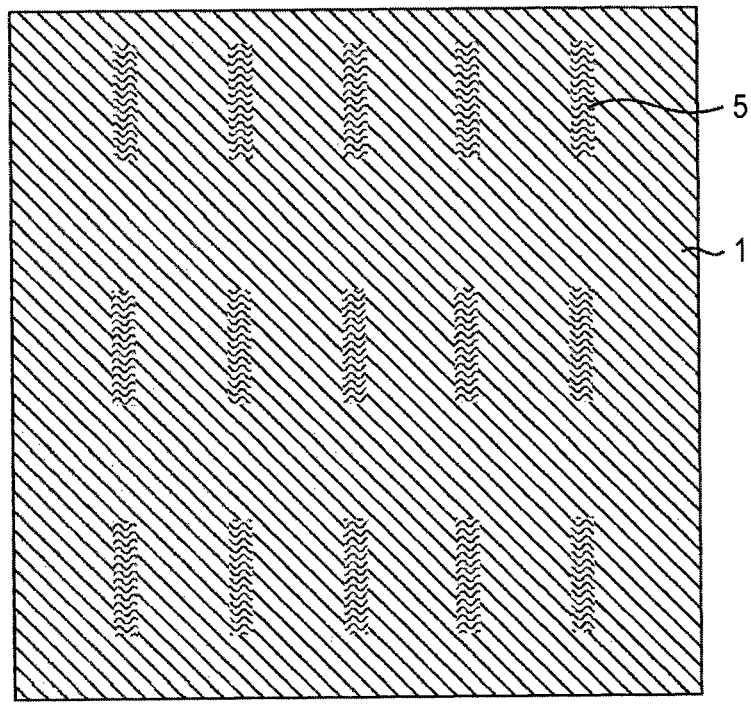
FIG. 5 is a schematic view of the example of the lining structure according to the present invention as viewed from a lining side.

In FIG. 5, the support portion 3 having a plate shape and having a depth in the direction perpendicular to a surface of a paper in the lining structure shown FIG. 2 is joined to the lining material at intervals by the joining portion 5 due to friction stirring.

Figure 6:
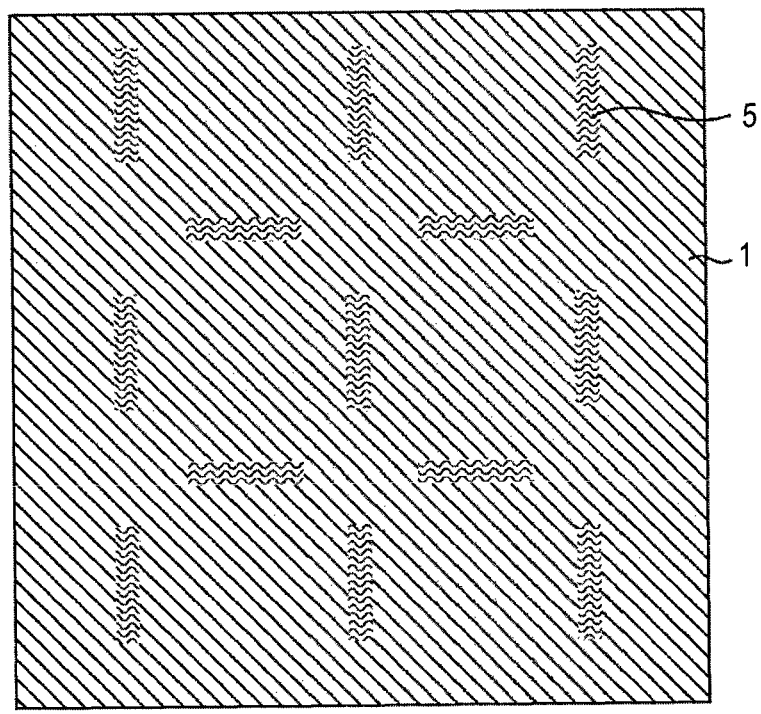
FIG. 6 is a schematic view of the example of the lining structure according to the present invention as viewed from a lining side.

In FIG. 6, the support portion 3 having a plate shape and having a depth in the direction perpendicular to a surface of a paper in the lining structure shown FIG. 2 is joined to the lining material at intervals by the joining portion 5 due to friction stirring while changing the direction of the support portion 3.

Figure 7:
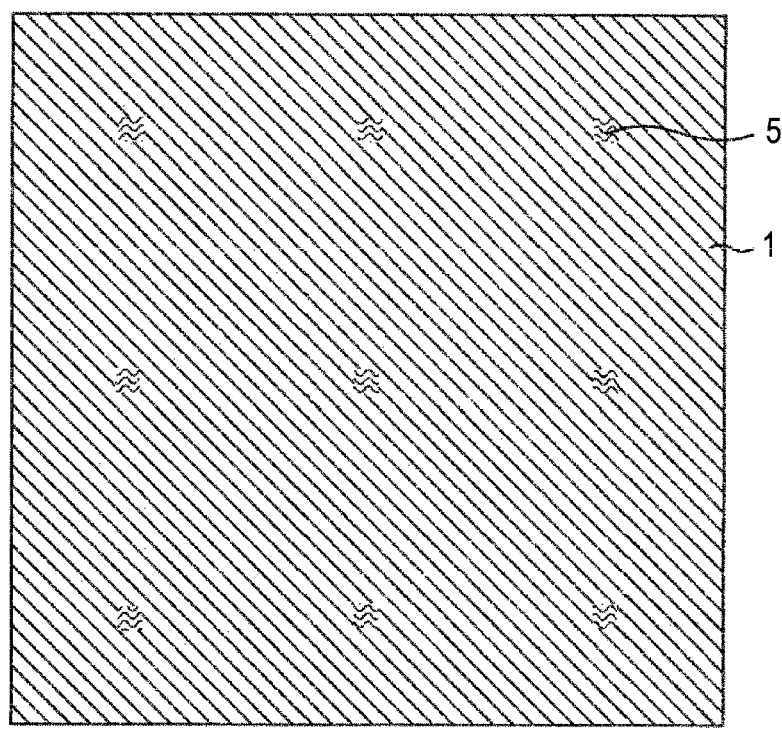
FIG. 7 is a schematic view of the example of the lining structure according to the present invention as viewed from a lining side.

In FIG. 7, the support portion 3 having a rod shape and arranged parallel to the thickness direction of the structural material portion 2 in the lining structure shown FIG. 2 and FIG. 3 is joined to a lining material by the joining portion 5 due to friction stirring.

A method of manufacturing the lining structure according to the present invention is explained by taking the lining structure shown in FIG. 1 as an example.

Figure 8:
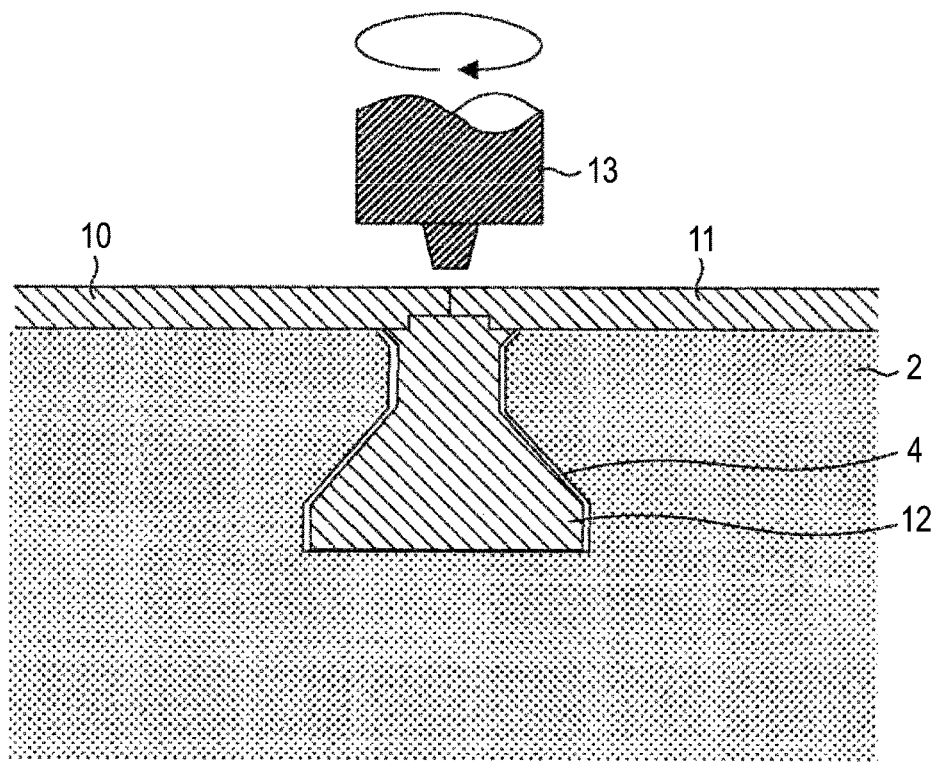
FIG. 8 is a schematic cross-sectional view showing an example of a method for manufacturing the lining structure according to the present invention.

In an example of a manufacturing method shown in FIG. 8, firstly, a rod-shaped support member 12 having a cross section shown in FIG. 8 is inserted into the hole 4 formed in the structural material portion 2 from a side surface of the structural material portion 2. Next, a lining plate 10 and another lining plate 11 are made to butt the support member 12, and a rotary tool 13 is pressed to the butting portion while being rotated at 200 rpm in a state where an argon gas which is an inert gas is blown to the butting portion at a flow rate of 20 L/min, and the rotary tool 13 is moved at a speed of 100 mm/min thus joining the lining plates 10, 11 to the support member 12. To prevent the occurrence of a phenomenon that a butting surface remains and a crack penetrates a lining material using a remaining butting surface as a crack initiation point, a butt groove size is designed such that at least a butting surface parallel to the plate thickness direction of the lining material is dissipated by friction stir welding.

Figure 9:
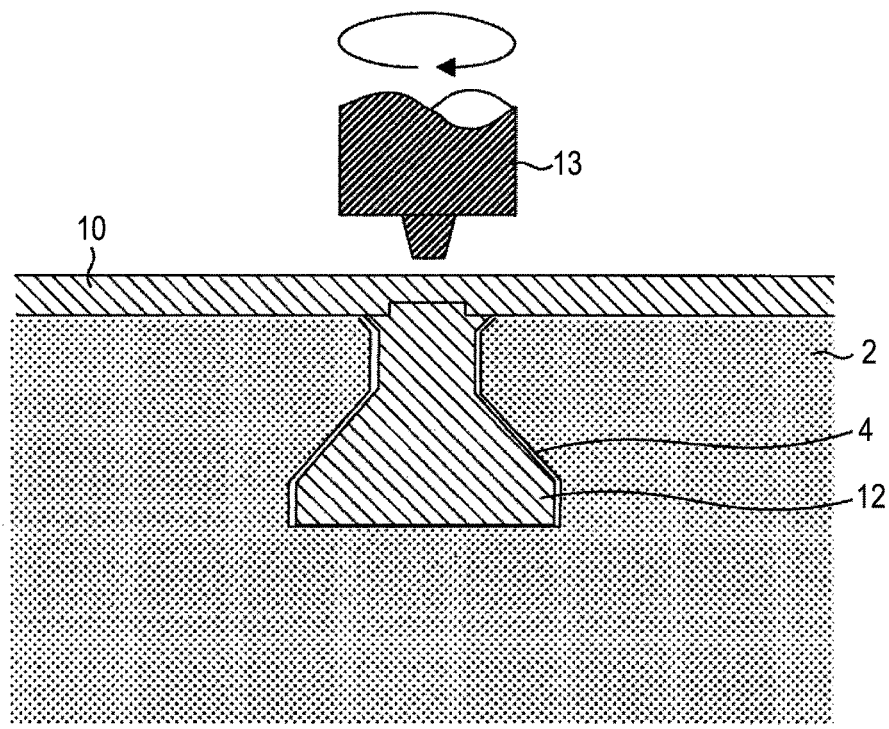
FIG. 9 is a schematic cross-sectional view showing an example of a method for manufacturing the lining structure according to the present invention.

In an example of a manufacturing method shown in FIG. 9, a groove formed in a sheet of lining plate 10 is made to butt a support member 12, and the lining plate 10 is joined to the support member 12 by friction stirring using a method substantially equal to the method shown in FIG. 8.

Figure 10:
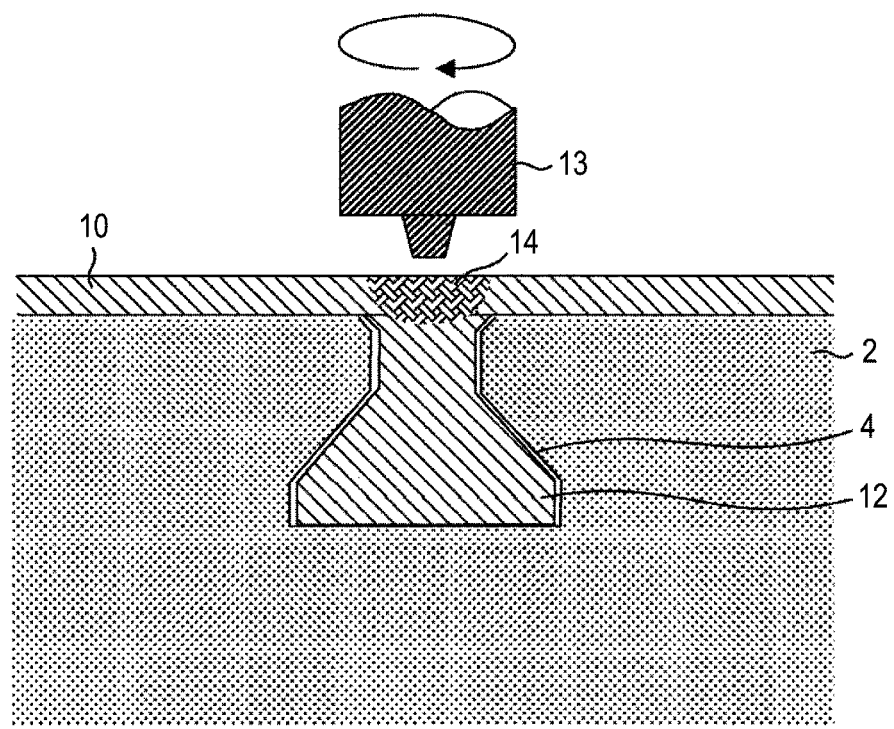
FIG. 10 is a schematic cross-sectional view showing an example of a method for manufacturing the lining structure according to the present invention.

In an example of a manufacturing method shown in FIG. 10, a lining plate 10 and a support member 12 are joined to each other by arc welding in advance under conditions where a joining atmosphere is an atmosphere of argon gas which is an inert gas with an oxygen and nitrogen partial pressure of less than 100 pa and an electric current is 170 A, a voltage is 9.8V and a welding speed is 60 mm/min. While blowing an argon gas which is an inert gas to a joining portion 14 at a flow rate of 20 L/min, a rotary tool 13 is pressed to the joining portion 14 while being rotated at 200 rpm, and the rotary tool 13 is moved at 100 mm/min thus applying friction stirring to the joining portion 14. Also in the lining structure shown in FIG. 2 and FIG. 3, the lining plate 10 is joined to the structural material portion 2 by inserting the support member 12 into the hole 4 formed in the structural material portion 2 from a side surface or a back surface of the structural material portion 2 using the substantially same manufacturing method.

The lining structure where the support member 12 is inserted into the hole 4 formed in the structural material portion 2 from a side surface of the lining of the structural material portion 2 and the manufacturing method of the lining structure are explained.

Figure 11:
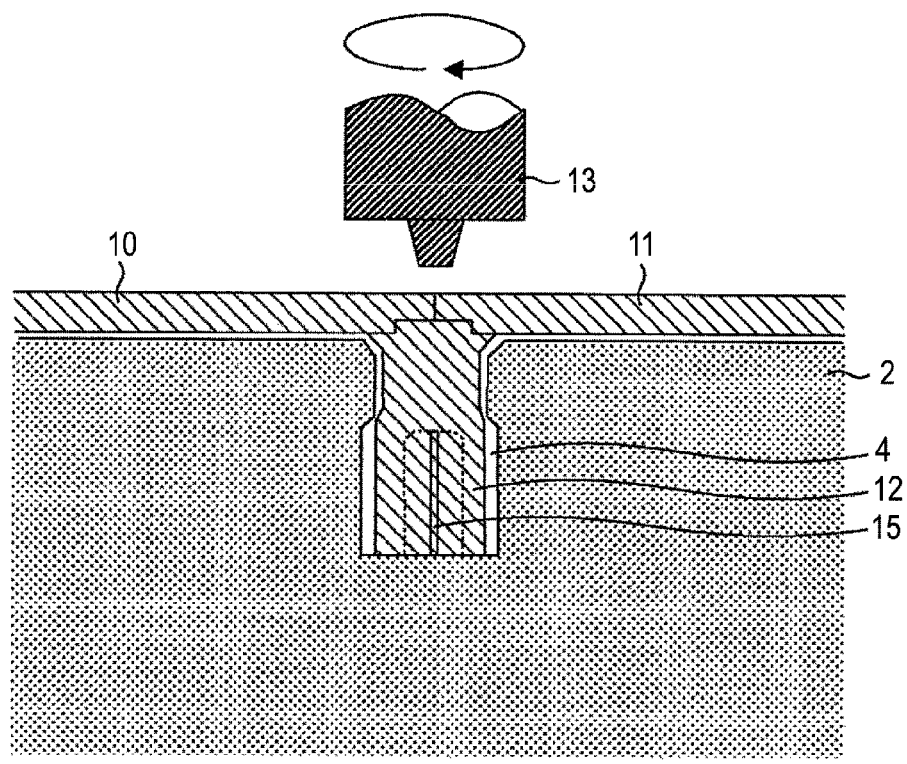
FIG. 11 is a schematic cross-sectional view showing an example of a method for manufacturing the lining structure according to the present invention.

In an example of manufacturing method shown in FIG. 11, firstly, the support member 12 which has a plate shape having a cross section shown in FIG. 11 and sets the depth direction with respect to a surface of paper as the longitudinal direction, or which has a rod shape parallel to the plate thickness direction of the structural material portion 2 is inserted into the hole 4 formed in the structural material portion 2 from a lining side surface of the structural material portion 2. The hole 4 formed in the structural material portion 2 is formed such that a size of a deep portion of the hole 4 is set larger than a size of portion of the hole 4 in the vicinity of an opening portion of the lining side surface. The support member 12 has a width smaller than a width of the hole 4 in the vicinity of the opening portion of the lining side surface so that the support member 12 can be inserted into the hole 4 formed in the structural material portion 2 from the lining side surface, and a height of the support member 12 is set larger than a depth of the hole 4 formed in the structural material portion 2. A cavity or cutout is preliminarily formed in an inserting portion of the support member 12 such that the support member 12 is easily deformable. Next, the friction stir welding is performed such that the lining plate 10 and another lining plate 11 are made to butt the support member 12, the rotary tool 13 is pressed to the butting surface while being rotated at a rotational speed of 200 rpm in a state where an argon gas which is an inert gas is blown to the butting surface at a flow rate of 20 L/min, and the rotary tool 13 is moved at a speed of 100 mm/min. In the friction stir welding, a load which presses the rotary tool 13 is applied to the support member 12 so that the inserting portion of the support member 12 is deformed.

Figure 12:
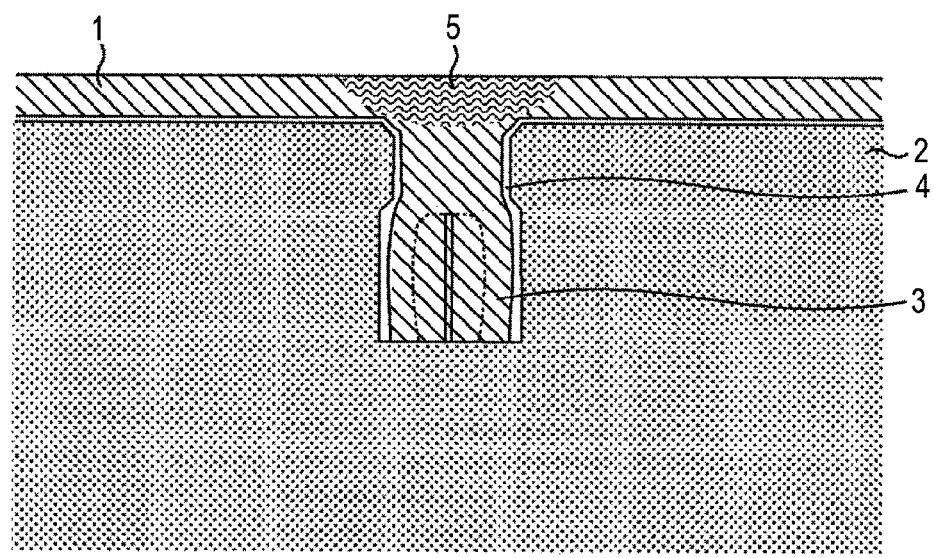
FIG. 12 is a schematic cross-sectional view showing an example of the lining structure according to the present invention.

As shown in FIG. 12, due to the deformation of an inserting portion of the support portion 3 which is joined to the lining portion 1 by friction stir welding, the support portion 3 cannot be removed from the hole 4 formed in the structural material portion 2 and hence, the lining portion 1 is fixed to the structural material portion 2 with a gap formed therebetween.

Figure 13:
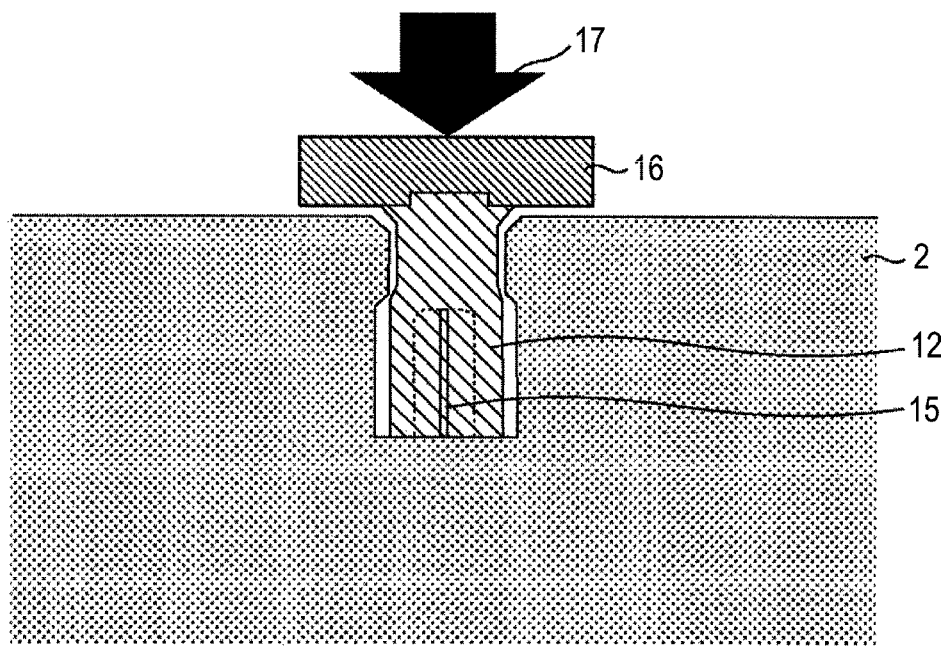
FIG. 13 is a schematic cross-sectional view showing an example of a method for manufacturing the lining structure according to the present invention.
Figure 14:
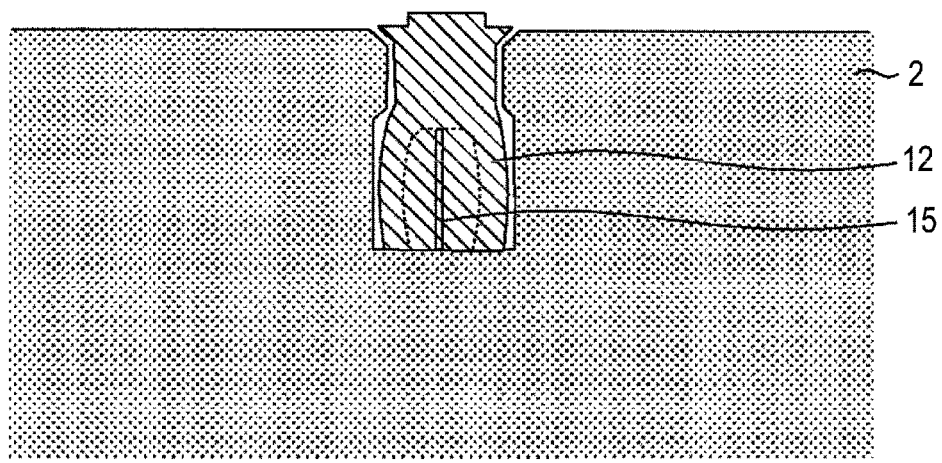
FIG. 14 is a schematic cross-sectional view showing an example of a method for manufacturing the lining structure according to the present invention.

The method for deforming the inserting portion of the support member 12 in friction stir welding is effective since joining and fixing of the lining material can be performed simultaneously. On the other hand, when it is necessary to deform the inserting portion of the support member 12 with a further larger load for firmly fixing the support member 12 to the hole 4 formed in the structural material portion 2, a load is applied before performing friction stir welding after protecting a butting surface of the support member 12 using a jig 16 as shown in FIG. 13, and the inserting portion of the support member 12 is deformed so as to prevent the removal of the support member 12 from the structural material portion 2 as shown in FIG. 14.

Figure 15:
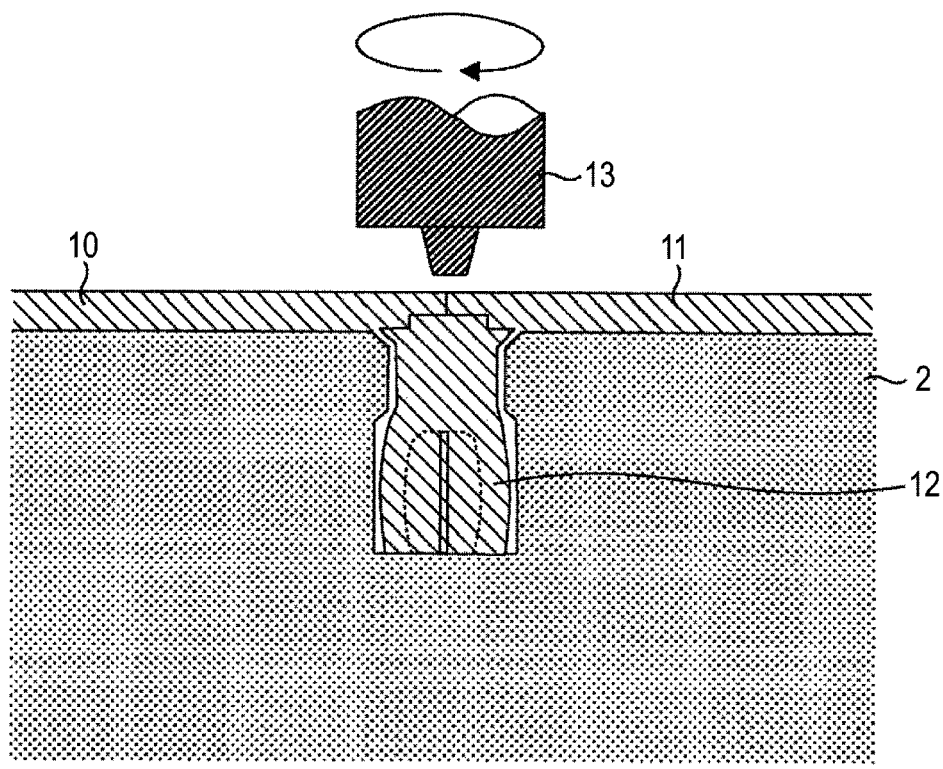
FIG. 15 is a schematic cross-sectional view showing an example of a method for manufacturing the lining structure according to the present invention.

Finally, as shown in FIG. 15, a lining plate 10 and another lining plate 11 are made to butt the support member 12, a rotary tool 13 is pressed to a butting surface while being rotated at a rotational speed of 200 rpm in a state where an argon gas which is an inert gas is blown to the butting surface at a flow rate of 20 L/min, and the rotary tool 13 is moved at a speed of 100 mm/min thus performing friction stir welding and thereby the lining structure shown in FIG. 12 is obtained.

Table 4 shows carbon concentration, oxide concentration, nitrogen concentration and hydrogen concentration in a lining structural joining portions made of zirconium and a zirconium alloy. Table 5 shows carbon concentration, oxide concentration, nitrogen concentration and hydrogen concentration in a lining structural joining portions made of titanium and a titanium alloy.

TABLE 4

| specimen | chemical composition (mass %) | | | |
|---|---|---|---|---|
| | C | N | O | H |
| pure zirconium | 0.032 | 0.0067 | 0.1355 | 0.0005 |
| zirconium alloy 1 | 0.016 | 0.0031 | 0.1297 | 0.0006 |
| zirconium alloy 2 | 0.010 | 0.0030 | 0.1170 | 0.0015 |

TABLE 5

| specimen | chemical composition (mass %) | | | |
|---|---|---|---|---|
| | C | N | O | H |
| pure titanium | 0.035 | 0.012 | 0.1250 | 0.0013 |
| titanium alloy 1 | 0.028 | 0.015 | 0.1476 | 0.0021 |
| titanium alloy 2 | 0.032 | 0.013 | 0.1162 | 0.0015 |

To compare the concentration of elements in the joining portion shown in FIG. 4 and FIG. 5 with the concentration of elements in the base material shown in Table 1 and Table 2, only the increase of approximately 10 ppm is observed with respect to nitrogen concentration, and only the increase of approximately 30 ppm is observed with respect to oxygen concentration, and no increase which exceeds upper limits of specification of the base material is recognized.

A tensile test result and a hardness measurement result of specimens cut out from the joining portions of the lining materials are shown in Table 6.

TABLE 6

| specimen | friction stirred portion (present invention) | | | | TIG welded portion | | | |
|---|---|---|---|---|---|---|---|---|
| | tensile strength | elongation | broken portion | hardness of joining portion | tensile strength | elongation | broken portion | hardness of joining portion |
| pure zirconium | 520 MPa | 26% | base material portion | 190 HV | 466 MPa | 17% | welded metal portion | 150 HV |
| zirconium alloy 1 | 530 MPa | 24% | base material portion | 200 HV | 470 MPa | 16% | welded metal portion | 155 HV |

TABLE 6-continued

| | friction stirred portion (present invention) | | | | TIG welded portion | | | |
|---|---|---|---|---|---|---|---|---|
| specimen | tensile strength | elongation | broken portion | hardness of joining portion | tensile strength | elongation | broken portion | hardness of joining portion |
| zirconium alloy 2 | 520 MPa | 25% | base material portion | 200 HV | 468 MPa | 18% | welded metal portion | 150 HV |
| pure titanium | 510 MPa | 25% | base material portion | 185 HV | 470 MPa | 17% | welded metal portion | 155 HV |
| titanium alloy 1 | 520 MPa | 25% | base material portion | 200 HV | 470 MPa | 17% | welded metal portion | 155 HV |
| titanium alloy 2 | 540 MPa | 25% | base material portion | 210 HV | 490 MPa | 15% | welded metal portion | 160 HV |
| stainless steel 1 | 600 MPa | 40% | base material portion | 230 HV | 595 MPa | 54% | base material portion | 180 HV |
| stainless steel 2 | 610 MPa | 40% | base material portion | 235 HV | 590 MPa | 50% | base material portion | 185 HV |
| nickel alloy 1 | 630 MPa | 30% | base material portion | 235 HV | 600 MPa | 30% | base material portion | 220 HV |
| nickel alloy 2 | 640 MPa | 30% | base material portion | 235 HV | 610 MPa | 40% | base material portion | 220 HV |
| nickel alloy 3 | 650 MPa | 25% | base material portion | 245 HV | 600 MPa | 30% | base material portion | 220 HV |

For a comparison purpose, a tensile test result of joining portions which are joined by TIG welding in advance under conditions where an atmosphere is an argon gas which is an inert gas having oxygen and nitrogen partial pressures of less than 100 Pa, an electric current is 170 A, a voltage is 9.8V and a welding speed is 60 mm/min.

According to the tensile test result of the TIG welding joining portions, when the joining portion is made of pure zirconium, a zirconium alloy, pure titanium, a titanium alloy 1 (α phase titanium alloy) or a titanium alloy 2 (α-β phase titanium alloy), breaking occurs at the welded metal portion thus providing undermatching joints in terms of strength. These welded metal portions exhibit the coarse α-phase structure. In all specimens cut out from the joining portions of the lining materials of the present invention, breaking occurs in the base material portion and the joining portion also exhibits ductility and hence, it is safe to say that the joining portion is an overmatching joint. The difference in Vickers hardness between the joining portion and the base material is 0 HV or more and less than 100 HV, and the joining portion exhibits the equiaxed fine grain structure having grain size of 0.5 to 10 µm.

Figure 16:
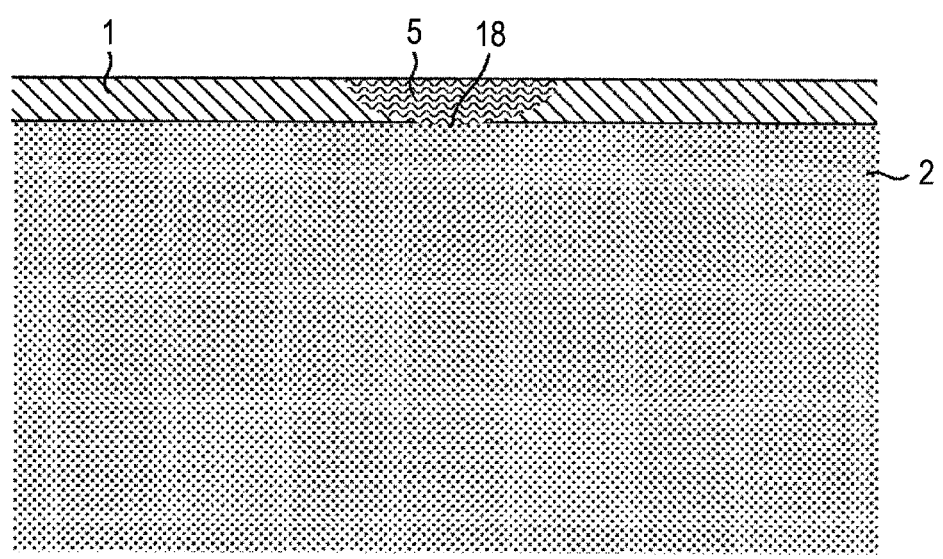
FIG. 16 is a schematic cross-sectional view showing an example of the lining structure according to a known example.

In JP-A-2006-255711 (patent document 3), a lining portion 1 is directly joined to a structural material portion 2 by friction stirring. The lining structure is schematically shown in FIG. 16. A joining portion 5 formed by friction stirring is a dissimilar joining portion which forms a diluted portion 18 on an interface between the lining portion 1 and the structural material portion 2. On the other hand, the joining portion 5 according to the present invention is a joining portion of the same composition metals formed by joining the lining material 10 and the support member 12 made of the same material. The dissimilar joining portion has a possibility that a brittle phase precipitates in thermal hysteresis at the time of joining or at the time of holding equipment at a high temperature in an operation of the equipment.

Figure 17:
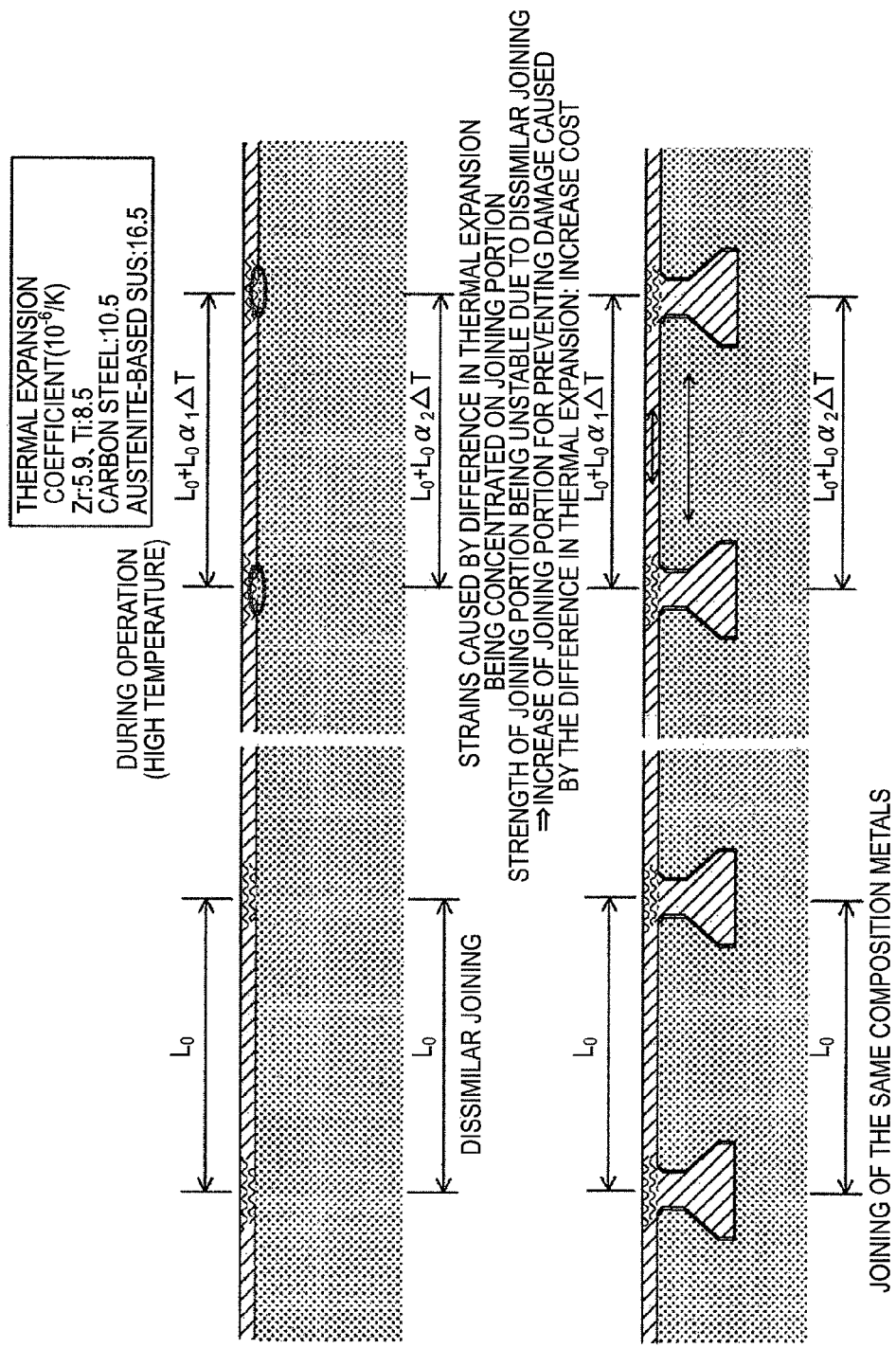
FIG. 17 is schematic cross-sectional view where the lining structure according to the present invention and the lining structure according to the known example are compared to each other with respect to the generation of strains caused by thermal expansion.

FIG. 17 conceptually shows a method of avoiding strains generated due to the difference in thermal expansion coefficients according to the present invention. Assuming a distance between two joining portions at a room temperature as $L_0$, the temperature difference between the room temperature and an equipment operation temperature as $\Delta T$, and thermal expansion coefficients of the lining material and the structural material portion as $\alpha_1$, $\alpha_2$ respectively, a distance between the joining portions at an operation temperature of the equipment according to the present invention becomes $L_0(1+\alpha_1\Delta T)$ with respect to the lining material and becomes $L_0(1+\alpha_2\Delta T)$ with respect to the structural material portion. Since an amount of the difference between these distances, that is, the size $L_0(\alpha_2-\alpha_1)\Delta T$ is less than a gap size between the support portion 3 and the hole 4 formed in the structural material portion 2 and thereby a stress caused by strains due to the difference in thermal expansion coefficient is not applied to the joining portion 5. Also with respect to the support portion 3 which penetrates the structural material portion 2 shown in FIG. 2 and FIG. 3, assuming a plate thickness of the structural material portion 2 at a room temperature as $T_0$, the size difference $T_0(\alpha_2-\alpha_1)\Delta T$ is caused due to the difference in thermal expansion coefficient between the support portion 3 and the structural material portion 2 in the plate thickness direction of the structural material portion 2 at an operation temperature of equipment. However, this size difference is less than a gap size between the support portion 3 and the hole 4 formed in the structural material portion 2 and hence, a stress caused by strains due to the difference in thermal expansion coefficient is not applied to the joining portion 5.

When equipment which evaporates nitric acid solution is operated at a normal pressure around 396K which is a boiling point of an azeotropic mixture, assuming that the temperature difference $\Delta T$ between a room temperature and an equipment operation temperature is 100K, pure zirconium (thermal expansion coefficient: $5.9\times10^{-6}K^{-1}$) is used as a high corrosion resistant material for forming the lining portion 1 and the support portion 3, and low alloy steel (thermal expansion coefficient: $11\times10^{-6}K^{-1}$) is used for forming the structural material portion 2, the size difference caused by the difference in thermal expansion coefficient generated between the joining portions 5 becomes $5\times10^{-4}L_0$, and the size difference caused by difference in thermal expansion coefficient generated in the plate thickness direction is $5\times10^{-4}T_0$. When the size between the joining portions 5 is 1000 mm and the plate thickness of the structural material portion 2 is 40 mm at a room temperature, the gap between the support portion 3 and the hole 4 formed in the structural material portion 2 is set to a size exceeding 0.5 mm in the plate lengthwise direction and in the plate width direction, and is set to a size exceeding 0.02 mm in the plate thickness direction.

In the structure shown in FIG. 16 where the lining material and the structural material portion are directly joined to each other, when the same material and the same equipment operating temperature condition are adopted, the joining portions 5 constrain each other at an operation temperature as shown in FIG. 17 and hence, strains of $5\times10^{-4}$ are generated due to the difference in thermal expansion coefficient and thereby a stress corresponding to the strains is applied to the joining portion 5. Loading and unloading of the stress are repeated for every start/stop operation so that there is a possibility that low cycle fatigue is induced.

As described above, in the lining structure according to the present invention, the lining portion 1 is fixed to the structural material portion 2 by way of the support portion 3 and also by forming the gap by taking into account the difference in thermal expansion coefficient and hence, a stress generated due to the difference in thermal expansion coefficient is not applied to the joining portion 5 at an equipment operation temperature and thereby breaking of the lining portion 1 due to low cycle fatigue caused by starting or stopping of the equipment can be suppressed. Further, the joining portion 5 of the lining portion 1 and the support portion 3 forms a joining portion of the same composition metals thus producing an overmatching joint in terms of strength and thereby breaking does not occur with a stress below the strength of the base material and the lining structure of the present invention has high reliability against damages on materials.

The high corrosion resistant material lining structure according to the present invention is applicable to a vessel, piping or the like which is exposed to a corrosive gas or liquid.

Figure 18:
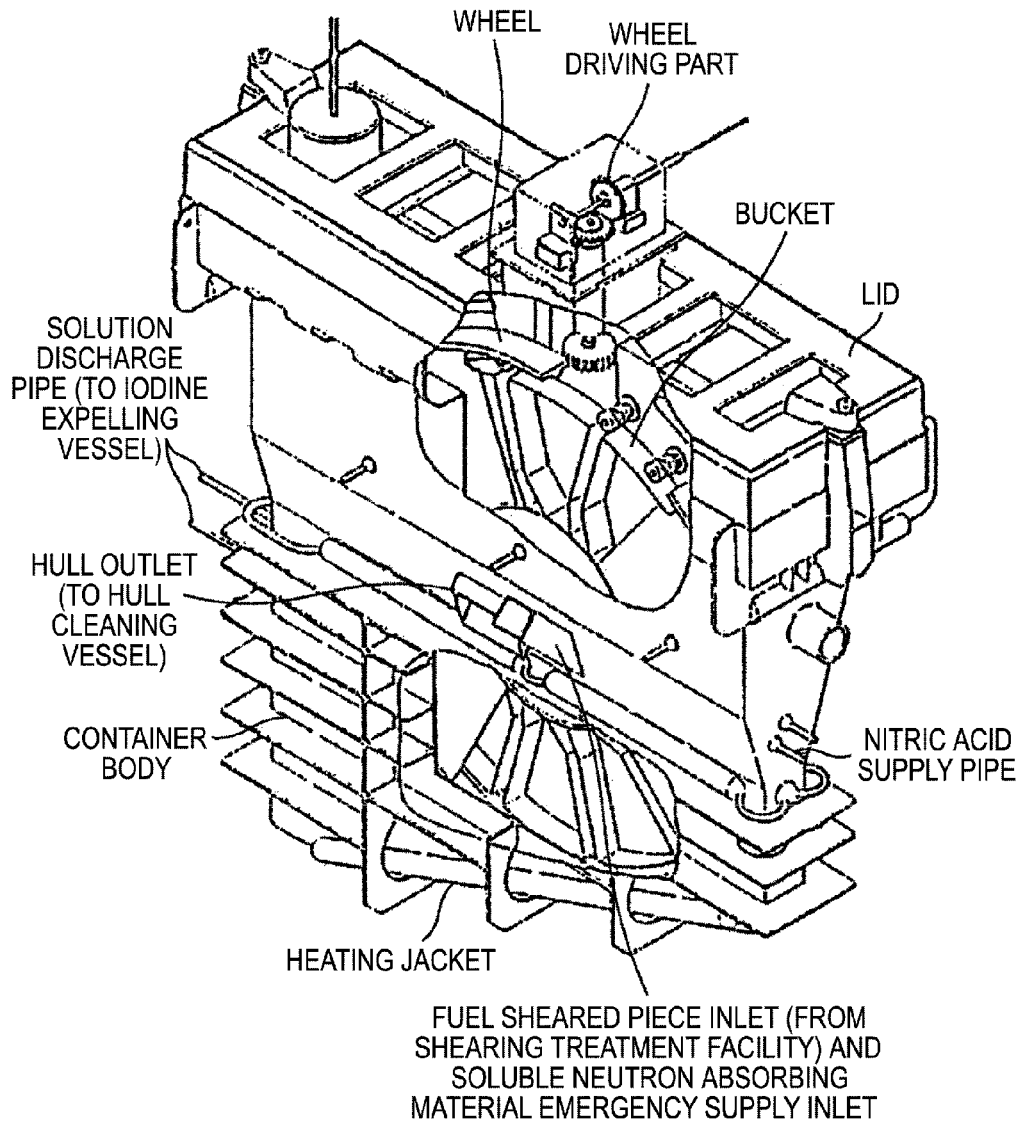
FIG. 18 is a conceptual view of a dissolver to which the lining structure according to the present invention is applied.

FIG. 18 conceptually shows a dissolver in which cut nuclear fuel rods are charged and nuclear fuel is dissolved in a nitric acid solution. The lining structure formed by using zirconium according to the present invention is applied to the inside of the dissolver.

Figure 19:
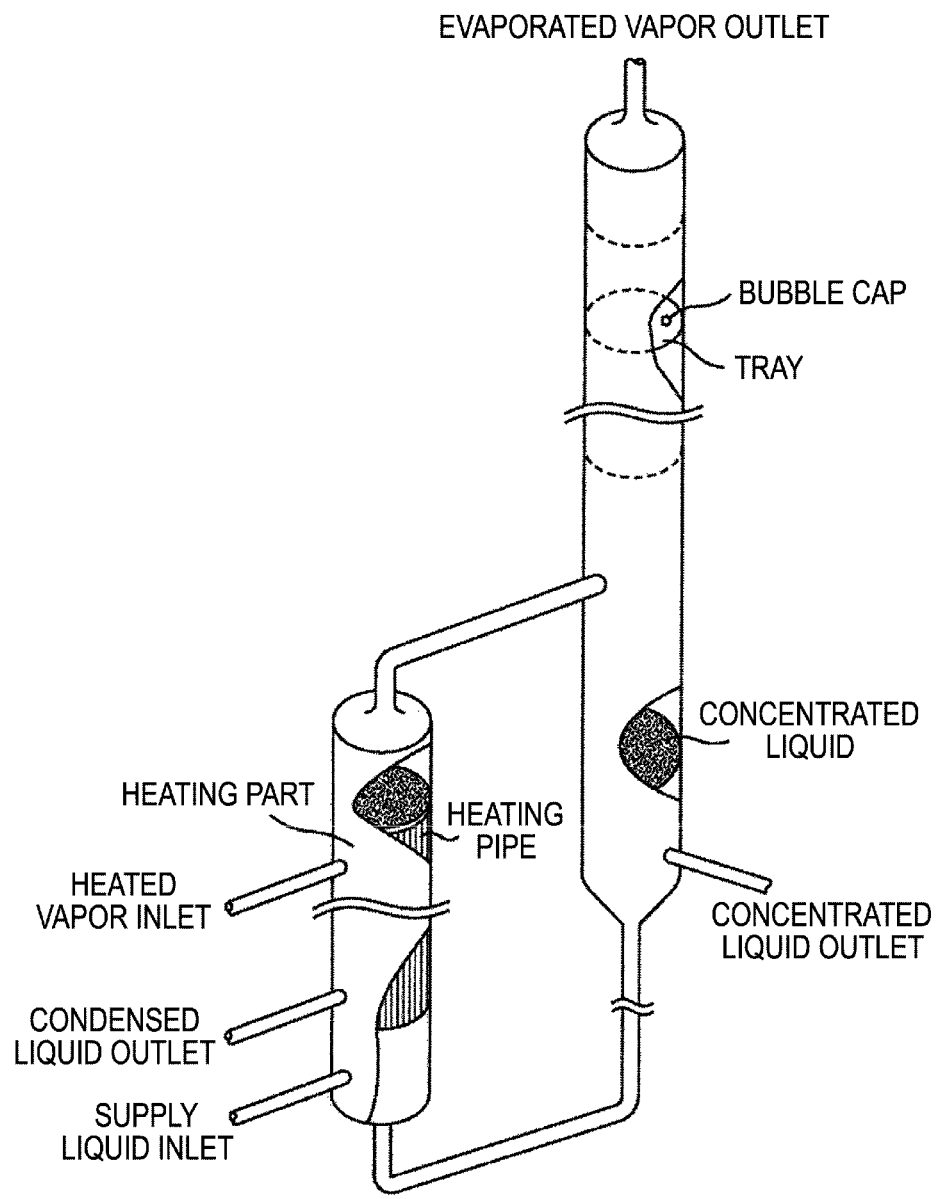
FIG. 19 is a conceptual view of a concentration tank to which the lining structure according to the present invention is applied.

FIG. 19 conceptually shows a concentration tank in which a nitric acid solution where a nuclear material such as plutonium is dissolved is concentrated. The lining structure formed by using zirconium according to the present invention is applied to the inside of a heating portion, a concentration tank vessel and piping.

Figure 20:
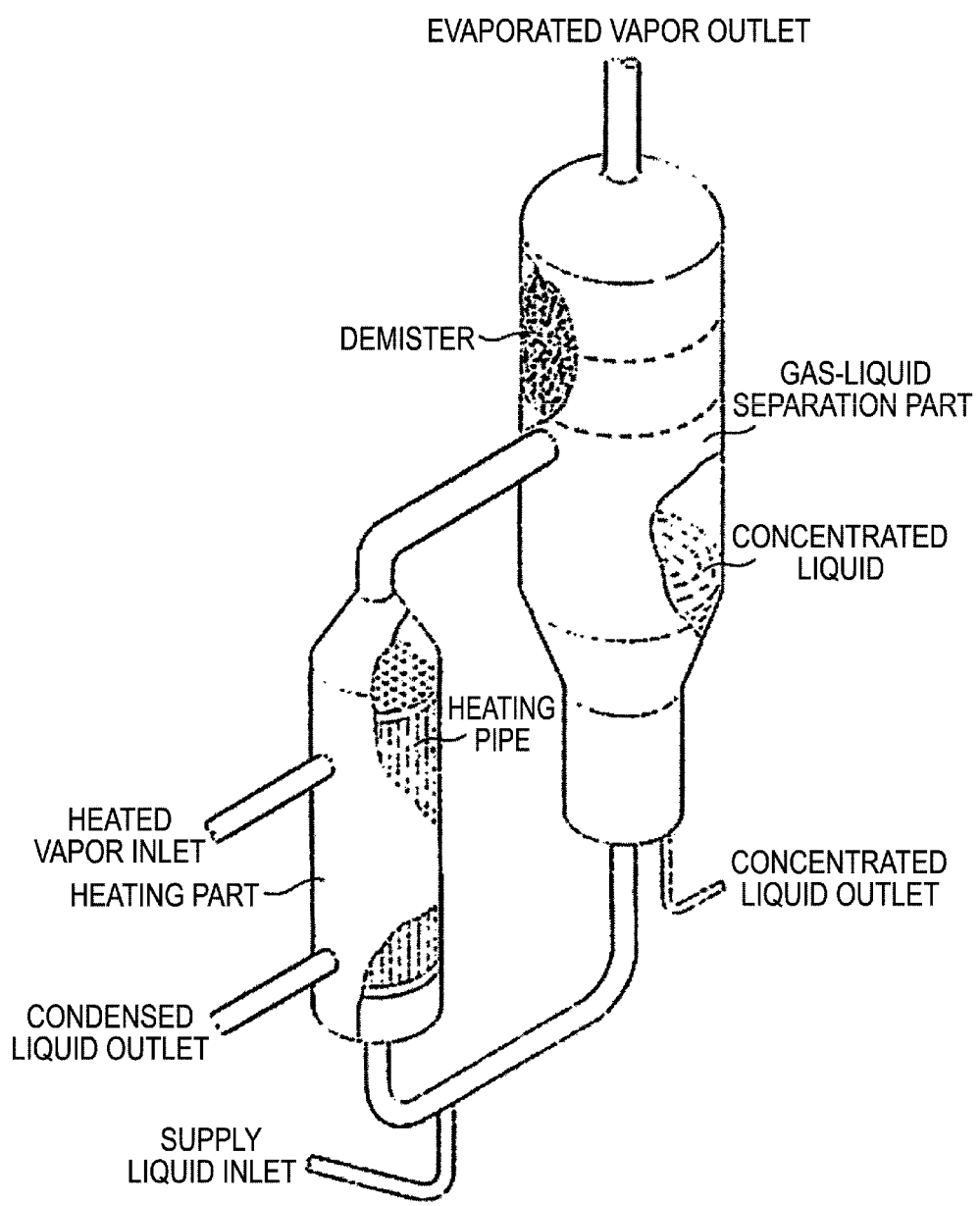
FIG. 20 is a conceptual view of an acid collecting evaporator to which the lining structure according to the present invention is applied.

FIG. 20 conceptually shows an evaporator for collecting a nitric acid. The lining structure formed by using zirconium according to the present invention is applied to the inside of a heating portion, an evaporator vessel and piping.

Figure 21:
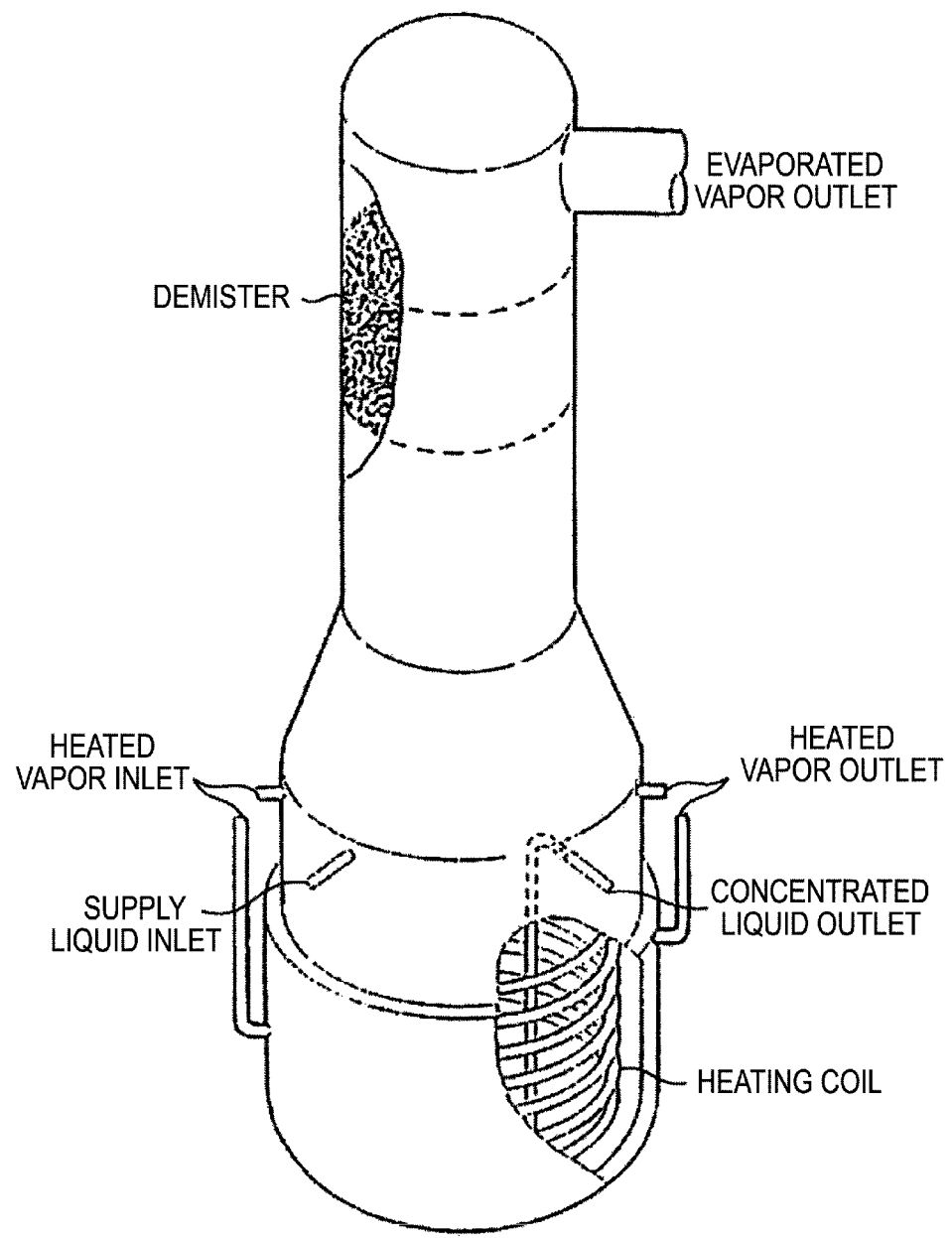
FIG. 21 is a conceptual view of a waste liquid concentration tank to which the lining structure according to the present invention is applied.

FIG. 21 conceptually shows a concentration tank in which a nitric acid solution containing a radio active waste at a high level is concentrated. The lining structure formed by using zirconium according to the present invention is applied to the inside of a concentration tank vessel.

In the high corrosion resistance equipment for a plant which is provided with the high corrosion resistant material lining structure according to the present invention, damages to the equipment caused by breaking of a lining material joining portion can be suppressed so that a lining material exhibits its original high corrosion resistant performance thus enabling an operation for a long period.

The present invention is applicable to a chemical product manufacturing device/equipment, nitric acid treatment facility/equipment and atomic nuclear waste reprocessing facility equipment which are required to exhibit excellent corrosion resistance.

What is claimed is:

1. Corrosion resistant equipment for a plant which includes a lining plate and a support portion which are made of a corrosion resistant material and a structural material portion, wherein
   the lining plate and the support portion are joined to each other by a joining portion formed by friction stirring, and the support portion is fastened to the structural material portion by the geometrical structure with a gap interposed between the support portion and the structural material portion; and
   the lining plate is indirectly fixed to the structural material portion by the support portion.

2. The corrosion resistant equipment for a plant according to claim 1, wherein the corrosion resistant material is one selected from a group consisting of zirconium, a zirconium alloy, titanium, a titanium alloy, stainless steel and a nickel alloy.

3. The corrosion resistant equipment for a plant according to claim 1, wherein oxygen concentration and nitrogen concentration of the joining portion of the lining plate and the support portion are set to values equal to or less than upper limit values of oxygen concentration and nitrogen concentration which are specification values of a base material respectively, the joining portion has the equiaxed grain structure having an average grain size of 0.5 to 10 μm, and the difference in Vickers hardness between the joining portion and the base material is 0 HV or more and less than 100 HV.

4. The corrosion resistant equipment for a plant according to claim 1, wherein a gap is set based on a change in size caused by thermal expansion in view of a temperature during an operation and the structure of the high corrosion resistant equipment for a plant.

5. The corrosion resistant equipment for a plant according to claim 1, wherein the joining portion is formed such that the lining plate and the support portion are joined to each other by friction stirring or a welded metal portion which is welded in advance in a vacuum having an oxygen or nitrogen partial pressure of 100 Pa or less or in an inert gas atmosphere is subjected to friction stirring.

6. The corrosion resistant equipment for a plant according to claim 1, wherein a hole formed in the structural material portion into which the support portion is assembled is formed such that a size of a depth portion is set larger than a size of an opening portion.

7. The corrosion resistant equipment for a plant according to claim 6, wherein the support portion is inserted into the hole formed in the structural material portion, and the support portion is deformed due to applying of a pressure load including friction stirring to the support portion so as to prevent the support portion from being removed from the hole formed in the structural material portion thus fixing the support portion to the structural material portion.

8. The corrosion resistant equipment for a plant according to claim 1, wherein the joining portion to which friction stirring is applied is formed by performing the friction stirring in a state where an inert gas is blown to the joining portion at a flow rate of 20 L/min or more.

* * * * *